United States Patent [19]

Glezer et al.

[11] Patent Number: 5,759,012
[45] Date of Patent: Jun. 2, 1998

[54] TURBINE DISC INGRESS PREVENTION METHOD AND APPARATUS

[75] Inventors: Boris Glezer, Del Mar; Michael D. Fox, San Diego, both of Calif.

[73] Assignee: Caterpillar Inc., Peoria, Ill.

[21] Appl. No.: 768,008

[22] Filed: Dec. 13, 1996

[51] Int. Cl.$^6$ .................................................. F04D 29/38
[52] U.S. Cl. .................................................. 415/115; 416/914
[58] Field of Search .......................... 415/115, 116, 415/914

[56] References Cited

U.S. PATENT DOCUMENTS

| 4,111,596 | 9/1978 | Amana et al. | 415/115 |
| 5,135,354 | 8/1992 | Novotny | 415/115 |
| 5,403,156 | 4/1995 | Arness et al. | 416/96 R |
| 5,511,945 | 4/1996 | Glezer et al. | 416/96 R |
| 5,609,466 | 3/1997 | North et al. | 415/115 |

FOREIGN PATENT DOCUMENTS

| 0043300 | 12/1991 | European Pat. Off. |
| 787666 | 12/1957 | United Kingdom. |
| 873651 | 7/1961 | United Kingdom. |
| 881816 | 11/1961 | United Kingdom. |
| 1 553 701 | 5/1976 | United Kingdom. |
| 2019503 | 10/1979 | United Kingdom. |
| 2032531 | 5/1980 | United Kingdom. |
| 2159585 | 12/1985 | United Kingdom. |
| 2165007 | 4/1986 | United Kingdom. |
| 2108202 | 5/1993 | United Kingdom. |

*Primary Examiner*—John T. Kwon
*Attorney, Agent, or Firm*—Larry G. Cain; O. Gordon Pence

[57] ABSTRACT

The invention disclosed and taught herein teaches method and apparatus for restricting the ingress of hot combustion gases into the turbine disc plenum of a gas turbine engine as the hot gases flow from a turbine nozzle assembly and into the turbine blades. A jet of engine cooling air is injected into the wake region immediately behind and down stream of the nozzle assembly's stator vanes thereby reducing the static pressure recovery otherwise occurring within the wake region. Thus, a lessor amount of buffering air is required within the turbine disc plenum to prevent the ingress of hot gases thereby resulting in an increased efficiency of the engine's cooling air delivery system and over all engine performance.

6 Claims, 4 Drawing Sheets

5,759,012

1

TURBINE DISC INGRESS PREVENTION METHOD AND APPARATUS

TECHNICAL FIELD

This invention generally relates to an air delivery system of a gas turbine engine for cooling a gas turbine engine turbine rotor assembly and more particularly to a method and apparatus for the restriction of hot gas ingress into the turbine rotor plenum.

BACKGROUND ART

To improve fuel economy characteristics, high performance gas turbine engines are typically operated at temperatures higher than the physical property limits of the materials from which the engine components may be constructed. This is particularly true of the engines "hot-section."

These higher temperatures, if not compensated for, result in oxidation of engine components and decreased component service life. Therefore, gas turbine engines are typically provided with an internal air delivery system whereby a flow of cooling air is circulated within the engine to limit the operating temperatures of the engine's "hot-section" and other components thereby ensuring reliability and long service life. Cooling air passages, internal to the engine, are typically used to direct the flow of such cooling air to the necessary engine components thereby reducing engine component temperature to a level which is consistent with the material properties of the particular component thus prolonging component service life.

Typically a portion of compressed air, bled from the engine compressor section, is used to cool the "hot-section" and other components. However, the amount of bleed air available from the compressor section is generally limited so that a main portion of the compressed air is reserved for engine combustion and providing the useful engine power.

As the operating temperatures of turbine engines are increased, to increase efficiency and power output, either the supply of cooling air must be increased, to cool the critical components, or better utilization of the available cooling air is required.

DISCLOSURE OF THE INVENTION

The present invention is directed to the turbine disc plenum area and a novel means of restricting the ingress of hot gases, exiting the upstream turbine nozzle assembly, into the turbine disc plenum.

As the hot gases exit the turbine's upstream nozzle assembly and are directed into the turbine blades, a wake flow region is created immediately behind and downstream of the trailing edge of each nozzle stator vane. Thus a recovery of static pressure occurs, within each wake region, thereby creating an elevated local peak static pressure, higher than the static pressure of the adjacent main stream hot gas flow. In order to prevent the ingress of hot gases into the turbine disc plenum a sufficient amount of buffering air must be introduced to overcome the elevated static pressure peaks created down stream of each nozzle stator.

By the present invention, means are taught whereby a jet of cooling air, taken from the engine's internal cooling air, delivery system, is introduced into the wake region immediately down stream of each nozzle stator vane, preferably at the vane's inner vane/shroud attachment, thereby reducing the magnitude of the static pressure peak therein.

By reduction of the wake region static pressure peaks the amount of buffering air, introduced into the turbine disc

2 plenum, may be correspondingly reduced resulting in an increased engine efficiency.

BEST MODE FOR CARRYING OUT THE INVENTION

Figure 1:
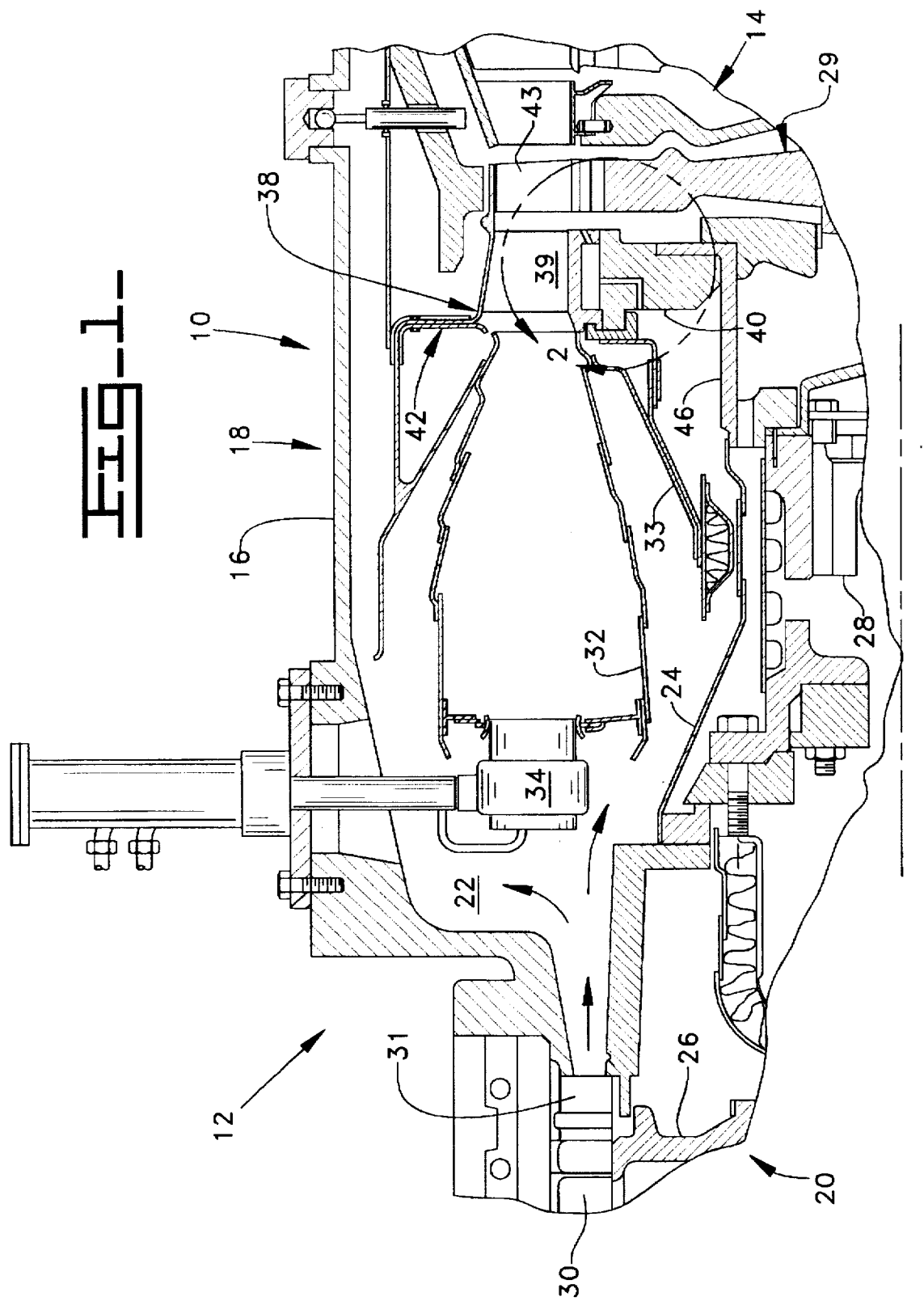
FIG. 1 is a sectional view of a portion of a typical gas turbine engine embodying the present invention.

Referring to FIG. 1, a typical gas turbine engine 10, not shown in its entirety, has been sectioned to show a typical cooling air delivery system 12 for cooling the hot components of the turbine section 14 of the engine. Engine 10 includes an outer case 16, a combustor section 18, a compressor section 20, and a compressor discharge plenum 22 fluidly connecting the air delivery system 12 to the combustor section 18. Plenum 22 is partially defined by the outer case 16 and a multipiece inner wall 24 partially surrounding combustor section 18. The compressor section 20 with rotor 26 includes a plurality of rotatable compressor blades 30 attached to a longitudinally extending center drive shaft, not shown, driven by the gasifier turbine assembly 29. A plurality of compressor stator vanes 31 extend radially inward from the outer case 16 and are positioned axially between the rows of rotatable compressor blades 30. Although the compressor section 20 is typically a multistage axial flow compressor only one stage (the final stage) is shown in FIG. 1 for simplicity.

The combustor section 18 typically includes an annular combustion chamber 32. located within plenum 22 about the center shaft. The combustion chamber 32 is typically supported within plenum 22 by a support 33. A plurality of fuel injection nozzles 34 are also positioned within plenum 22 at the forward end of the combustion chamber 32 as illustrated in FIG. 1. It should also be recognized that a plurality of annular can combustors (not shown) circumferentially spaced within plenum 22 about the center shaft, could also be used.

Turbine section 14 includes gasifier turbine assembly 29 disposed partially within an integral first stage nozzle and shroud assembly 42. Shroud assembly 42 includes a plurality of individual, radially extending stator vanes 39. Shroud assembly 38 is supported from the center shaft bearing housing 46 by a series of thermal masses 40 which are provided to prevent rapid thermal growth during heating and cooling cycles of the engine components. A nozzle support case is disposed within outer case 16 and attached to case 16 by a mechanical fasteners and dowels not shown.

Figure 2:
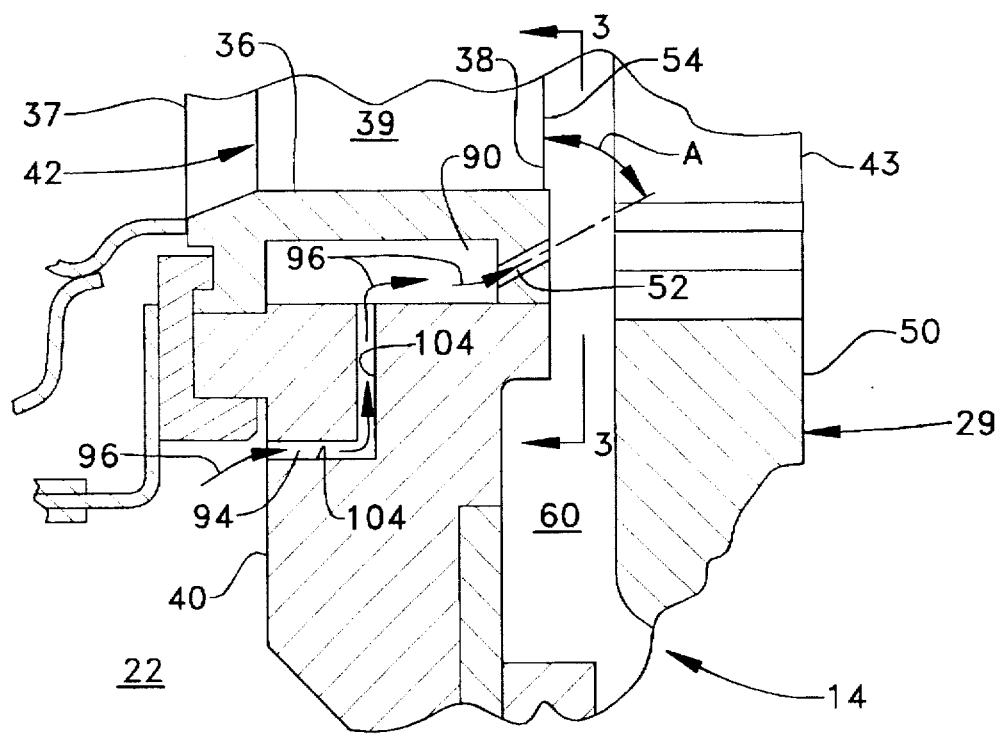
FIG. 2 is an enlarged sectional view of the encircled portion of FIG. 1.

As further shown in FIG. 2, the gasifier turbine assembly 29 includes a turbine rotor or disc 50 having a multiplicity of replaceable turbine blades, or buckets, 43 circumferentially affixed to the periphery thereof. For a detailed description of a preferred method of attaching turbine blades 43 to turbine disc 50 the reader is referred to co-owned U.S. Pat. No. 5,511,945 "Turbine Rotor And Blade Interface Cooling System" issued to Messrs: Boris Glezer, Aaron R. Fierstein, and Russell B. Jones on Apr. 30, 1996.

The cooling air delivery system, of engine 10 includes, a fluid flow path 94 from the compressor discharge plenum 22 to the turbine section 14. During engine operation, a flow of pressurized cooling air, designated by the arrows 96, is provided within the fluid flow path 94. The fluid flow path 94 includes a plurality of internal engine passages, not shown, within engine 10. A portion of the internal passages are within the bearing housing 46 and the combustion support assembly 33.

Flow path 94, for the passage of cooling air 96, further includes a plurality of passages 104 within the thermal masses 40. The plurality of passages 104 fluidly connecting the internal engine cooling air delivery passages with cooling air cavity 90, within the inner shroud 36 of nozzle assembly 42, thereby providing a flow of cooling air thereto.

The following detailed description of the present invention will be directed to the first stage turbine nozzle assembly 42, however, it is to be understood that the cooling technique may be applied to the remainder of the turbine stages in a similar manner.

Figure 3:
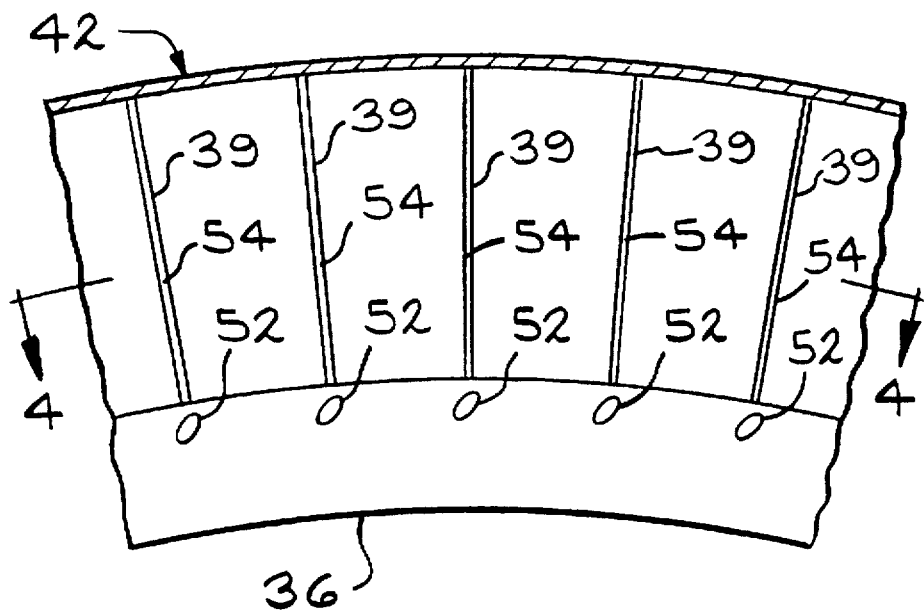
FIG. 3 is an elevational view taken along line 3—3 in FIG. 2 showing a portion of the first stage turbine nozzle embodying the present invention.
Figure 4:
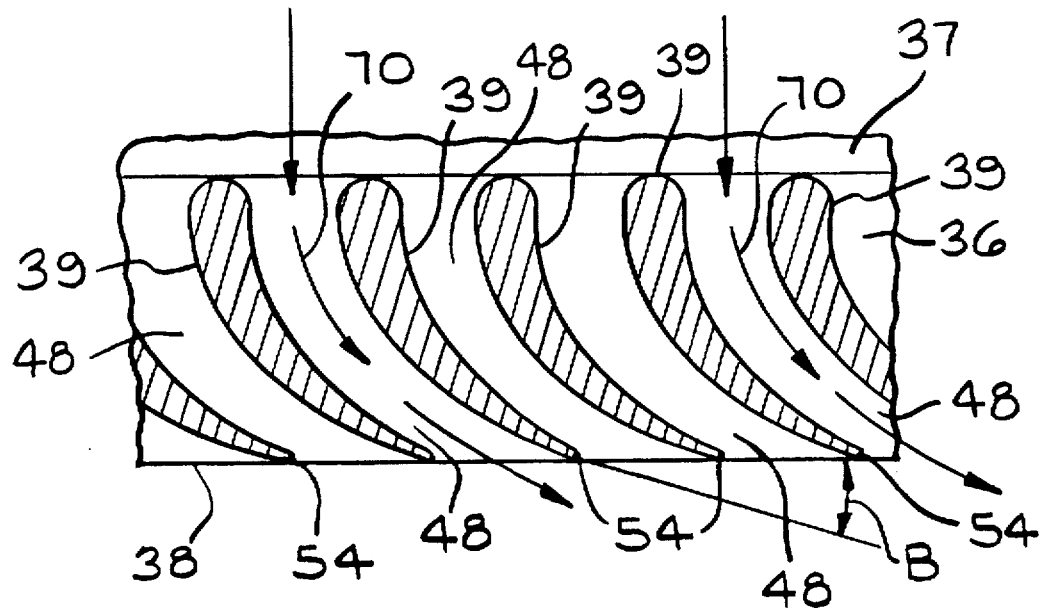
FIG. 4 is a cross sectional view taken along line 4—4 in FIG. 3 illustrating the flow of hot gas through the first stage nozzle stator vanes.

With reference to FIGS. 2, 3 and 4, a cooling air discharge passage or port 52 is provided within the inner shroud 36 of nozzle assembly 42 whereby a jet of cooling air is emitted from cavity 90, through a plurality of discharge ports 52, and into the turbine disc plenum 60 immediately below the trailing edge of each stator vane 39. As will be further described below, discharge ports 52 are preferably directed upward at an angle A with respect to the stator vane trailing edge radial plane 38, as indicated in FIG. 2, and also directed tangentially at an angle B with respect to each stator vane 39, as indicated in FIG. 4. It should be recognized in the embodiment of this specification that angle A is in the range of about 20 to 60 degrees, and angle B is in the range of about 15 to 30 degrees.

Figure 2A:
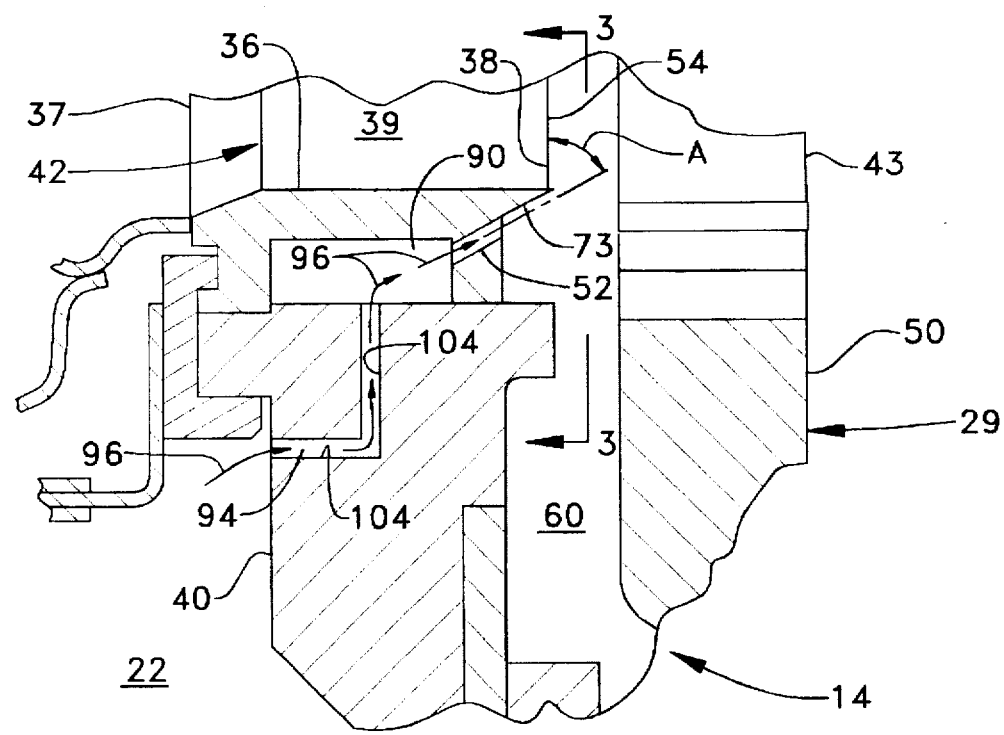
FIG. 2A is an enlarged sectional view of an alternate embodiment of the encircled portion of FIG. 1.

An alternative is shown in FIG. 2A. For example, the inner shroud 36 includes a shelf 71 defining an inclined surface 73. In this alternative, the inclined surface has an angle being generally equal to that of the angle A of the discharge port 52. Functionally, the shelf 71 and the inclined surface 73 contribute to the effectiveness of the jet of cooling air emitted from the cavity 90 through the port 52.

Figure 3A:
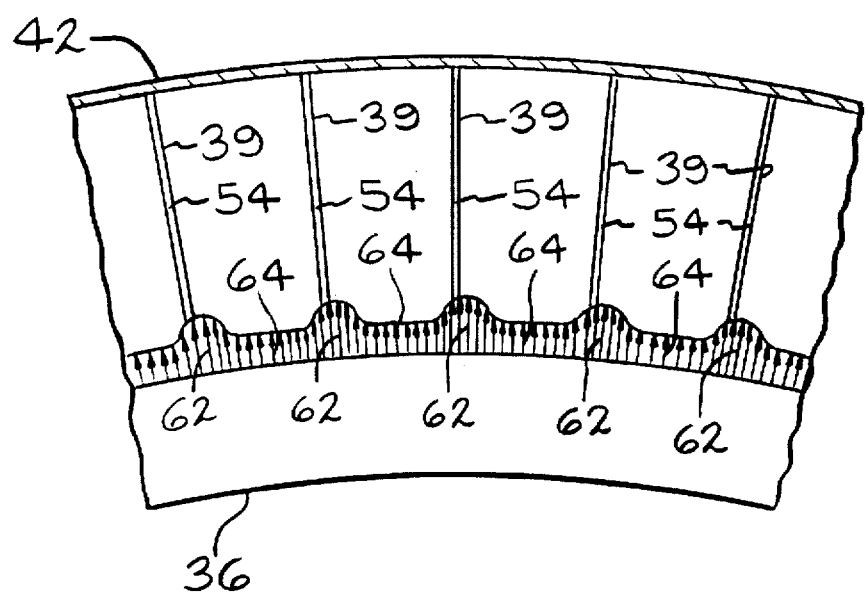
FIG. 3A presents a schematic illustration of the exit end of the first stage turbine nozzle, as illustrated in FIG. 3, with a representative prior art, circumferential, static pressure distribution immediately down stream of the nozzle stator vanes without the present invention.
Figure 5:
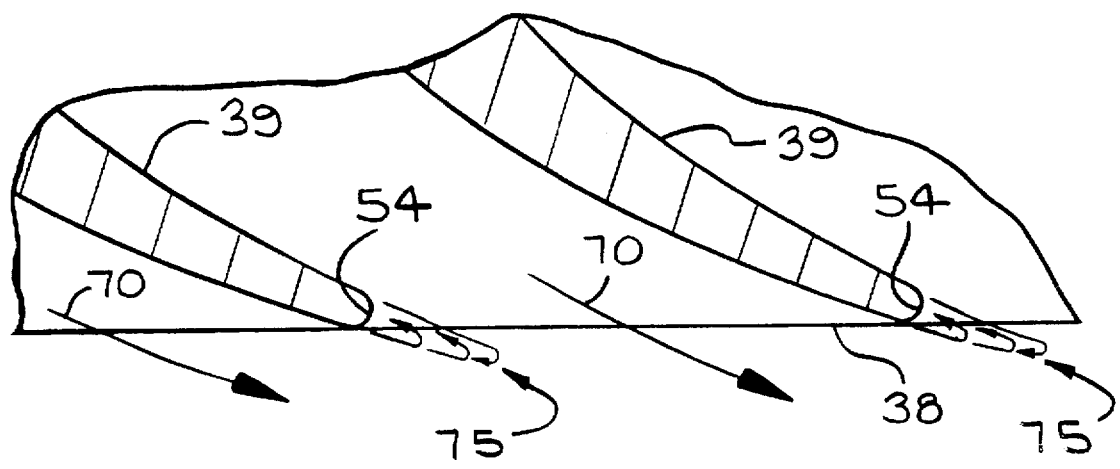
FIG. 5 presents a greatly enlarged schematic illustration of the hot gas flow as it exits the nozzle's stator vanes showing the wake region of disturbed gas flow immediately downstream of the stator vane's trailing edge.

Referring to FIGS. 3A, 4, and 5, the circumferential array of adjacent turbine stator vanes 39 typically create a progressively narrowing flow accelerating channel 48 therebetween from the stator assembly's upstream, leading edge radial plane 37 to the nozzle assembly's downstream, trailing edge radial plane 38. Thus, in accord with Bernoulli's theorem, the velocity of the hot gas flow 70, as it exits the combustion chambers 32 and passes through the venturi like channels 48 between adjacent stator vanes 39, increases in velocity resulting in a corresponding decrease in the static pressure of the flow.

Assuming an isothermal flow within all stator channels 48, the hot gas flow 70 would be expected to exhibit a circumferentially uniform static pressure. However, as the hot flow 70 exits from the flow accelerating channels 48 an affect of pressure recovery occurs within the wake of the exiting flow immediately downstream of each stator vane's trailing edge 54 which has a finite thickness as shown in FIG. 5. FIG. 5 has been greatly enlarged to more clearly show the wake region flow 75 expected to form immediately down stream of each stator vane trailing edge. Thus the static pressure within the trailing edge wake region 75, immediately downstream of each stator vane's trailing edge 54, will be higher than the static pressure within the, otherwise undisturbed hot gas flow 70 as it exits the channels 48 between stator vanes 39.

FIG. 3A presents a schematic presentation, similar to FIG. 3, looking upstream into the exit end of nozzle assembly 42 and graphically illustrates the circumferential static pressure distribution immediately downstream of the nozzle assembly's downstream trailing edge radial plane 38 in absence of the present invention. The recovery of static pressure immediately behind each stator vane trailing edge 54 being indicated by vectors 62.

During engine operation it is desirable to maintain a static pressure within turbine plenum 60 (see FIG. 2) sufficient to prevent the ingress of hot gases 70 radially into the plenum. This is usually achieved by supplying an extra amount of buffering air into the disc plenum. Therefore, referring to the pressure distribution as presented in FIG. 3A, the static pressure within turbine disc plenum 60 would have to be at least equal to the wake region static pressure 62. If the static pressure, within plenum 60 were only equal to the channel static pressure, as indicated by vectors 64, there would be a resulting ingress of hot gasses 70 radially inward to plenum 60 immediately downstream of each stator vane trailing edge 54 by virtue of the elevated static pressure within the wake flow region 75.

However, if the elevated peaks of static pressure 62, within wake flow region 75, were reduced and/or eliminated, a correspondingly lower static pressure may be maintained within turbine plenum 60 resulting in savings of the required amount of buffering air and thereby result in an over all greater efficiency of the gas turbine cooling air delivery system.

Returning now to FIGS. 2, 3, and 4. In accord with the present invention the elevated wake region static pressure 62 behind each stator vane trailing edge 54 in the vicinity of the trailing edge attachment to the inner shroud 36 may be reduced by introducing a small amount of cooling air (mass injection) directly into each trailing edge wake region 75, near the shroud 36, from cooling air discharge ports 52. The preferred angle B for port 52 should introduce the jet of cooling, air discharged from port 52, with a velocity vector similar to the velocity vector of the main stream hot gas flow 70 exiting stator assembly 42.

Thus by reducing the magnitude of static pressure within wake region 75 the cooling air delivery system 12 more efficiently prevents ingestion of hot gases into the turbine plenum 60 of the gas turbine engine 10.

Furthermore, the primary advantages of the improved turbine cooling system provides a more efficient cooling air usage of the compressor section 20, increases the component life and efficiency of the engine and insures that the main portion of the compressed air is used for combustion and creating useful power output.

While the invention has been described in the inventors' preferred embodiment, it is evident that many alternatives, modifications, and variations will be apparent to those skilled in the art in light of the foregoing teachings. Such variations may include, but are not necessarily limited to, varying apparatus for conveying the flow of cooling air inside the stator vanes and providing exit ports at selected locations along the trailing edge of each stator vane.

Accordingly, the invention is intended to embrace all such alternatives, modifications and variations as fall within the spirit and scope of the appended claims.

We claim:

1. A cooling air delivery system for cooling the internal components of a gas turbine engine having a turbine assembly, a compressor section and a compressor discharge plenum fluidly connecting the air delivery system to the compressor section comprising:

a) a fluid flow path between the compressor section and the turbine assembly, said fluid flow path interconnecting the compressor discharge plenum with the engine components to be cooled and having a flow of cooling air therethrough when the compressor section is in operation;

1) said turbine assembly including a nozzle assembly positioned upstream of a rotatable turbine, said nozzle assembly including an inner and outer circumferential shroud having a multiplicity of circumferentially spaced stator vanes radially extending therebetween and forming separated fluid flow channels between said stator vanes whereby a flow of hot gases pass through said flow channels and upon exiting said flow channels thereby creating a wake region of disturbed flow, within said hot gas flow, immediately downstream of each of said stator vanes trailing edge, b) a jet of cooling air being introduced into each of said wake regions, said jet of cooling air being introduced into said wake regions comprises a multiplicity of circumferentially spaced air dispensing orifices within said inner shroud, each of said orifices fluidly connected to said air delivery system, and being directed tangentially in the direction of said exiting flow of hot gases, and each of said orifices also includes said jet of cooling air being directed angularly upward into said wake region.

2. The cooling air delivery system as claimed in claim 1 wherein each of said orifices is positioned immediately under a nozzle stator vane trailing edge.

3. The cooling air delivery system as claimed in claim 1 wherein said inner shroud of the nozzle assembly includes a shelf defining an inclined surface.

4. The cooling air delivery system as claimed in claim 3 wherein said inclined surface has and angle being generally equal to said upward angularly directed jet of cooling air.

5. The improvement as claimed in claim 1 wherein said gaseous discharge orifice includes said injected flow of gas being directed into the wake region immediately downstream of each stator vane trailing edge at the juncture of said stator vane and said inner shroud.

6. The improvement as claimed in claim 5 wherein said injected flow of gas is directed tangentially to match the hot gas flow direction as it exits said nozzle assembly.

\* \* \* \* \*

UNITED STATES PATENT AND TRADEMARK OFFICE
CERTIFICATE OF CORRECTION

PATENT NO.   : 5,759,012
DATED        : JUNE 2, 1998
INVENTOR(S)  : BORIS (NMI) GLEZER, ET AL

It is certified that error appears in the above-identified patent and that said Letters Patent is hereby corrected as shown below:

Column 1, under Background Art, insert the following:

"This invention was made with Government support under Contract No. DE-FC21-95MC31173 awarded by the U. S. Department of Energy. The Government has certain rights in the invention."

Signed and Sealed this

First Day of June, 1999

Attest:

Attesting Officer

Q. TODD DICKINSON

Acting Commissioner of Patents and Trademarks